Patented Apr. 14, 1925.

1,533,622

UNITED STATES PATENT OFFICE.

JOHN J. VARN BUHLER, OF DETROIT, MICHIGAN.

RUST-REMOVING COMPOUND.

No Drawing. Application filed December 28, 1921. Serial No. 525,472.

*To all whom it may concern:*

Be it known that I, JOHN J. VARN BUHLER, a citizen of the United States, residing at Detroit, county of Wayne, State of Michigan, have invented a certain new and useful Improvement in Rust-Removing Compounds, of which the folowing is a specification.

My invention relates to compounds for the treatment of metal for the purpose of removing rust and cleaning the surface from such substances as rust or other forms of oxidization, grease, finger marks, rolling mill scale, mineral paint and the like. It is especially intended for use in the manufacture of metal articles, such as parts of automobiles, which are subsequently enameled or painted. The particular object of the invention is to make a compound which will clean the surface of the metal more thoroughly, will act more rapidly and will leave the metal in such a condition that it will not rust if not immediately enameled or painted. The compound embodying my invention acts very much more rapidly and leaves the surface in a much cleaner condition than the compounds now in commercial use, most of which as I am informed, contain phosphoric or oxalic acid or their compounds.

The compound embodying my invention also has the very valuable property of partially rust-proofing the surface due, I believe, to the fact that the oil which the compound contains is carried to the thoroughly cleaned surface of the metal before the surface has been exposed to the air.

In the following description, I have stated the materials entering into my compound and the proportions in which they are used in the form which I believe to be the best, but I do not limit myself to this combination or proportions since I believe that I am the first to produce a compound for the purposes mentioned which consists essentially of an alcoholic solution of a rust-preventing liquid, such as an oil or glycerine in combination with an acid like hydrochloric acid which will attack the rust but will not combine with the rust-preventing substance.

It will also be understood from the following description that glycerine may be substituted for the oil under certain conditions and therefor is to be treated as its equivalent.

In manufacturing the compound embodying my invention in its preferred form, I cut the rust-preventing liquid, such as raw linseed oil, in boiling alcohol or in cold alcohol, the proportions being varied accordingly. As is well understood by those skilled in the art, five parts of boiling alcohol will combine with or dissolve one part of raw linseed oil, while forty parts of cold alcohol will combine with one part of raw linseed oil. I then take twenty-four ounces of this solution, preferably that made by the use of boiling alcohol and add to it fifty-six ounces of alcohol, preferably wood alcohol, and forty-eight ounces of hydrochloric acid of ordinary commercial strength. The ingredients are then thoroughly mixed and are ready for use.

Another compound which is satisfactory for other uses is made by adding one gallon of distilled water to ten gallons of the linseed oil and alcohol solution already described. The rust removing compound is then made, combining equal parts of this solution with acid and alcohol; thus—$42\frac{3}{4}$ ounces of the oil solution by volume, $42\frac{3}{4}$ ounces of hydrochloric acid by weight and $42\frac{3}{4}$ ounces of alcohol by volume, will make substantially one gallon of the compound.

Still a third compound can be made in the following manner:—32 ounces of hydrochloric acid, 64 ounces of alcohol, 32 ounces of glycerine. If desired, to ten gallons of the above may be added one gallon of distilled water. In using any of the above compounds, the surface of the metal to be cleaned is saturated with the compound and then rubbed or scoured gently with a suitable abrasive substance such, for instance, as steel wool. The metal is then wiped and washed in water. Any deeply pitted, scratched or creased places may, if necessary, be treated a second time. It will be found that the rust, grease, and other substances which interfere with the adhesion of the paint or enamel to the surface of the metal will be thoroughly removed, and the surface will be bright. It is particularly noticeable that the use of my compound does not leave the brownish, blackish or grayish appearance which is characteristic of metals which have been cleaned with phosphoric acid or similar substances, but on the contrary, the metal is much brighter and more brilliant, indicating that the metallic surface is completely freed from all exterior substances.

From the foregoing, it will be seen that the compound embodying my invention contains a rust-attacking substance, such as hydrochloric acid, a rust-preventing substance, such as linseed oil, and a solvent for the rust-preventing substance.

It is found that metal when cleaned with the hereindescribed rust removing compound, particularly that containing raw linseed oil, remains in a bright unoxidized condition for a relatively long time. This is a great advantage, because it makes it possible to clean the metal parts considerably in advance of the enameling or painting operations. I believe that the action producing this result is as follows:—

When the compound is applied to the surface of rusted or dirty metal, the rust is attacked by the acid, and substances such as grease, oil or pitch, are dissolved by the alcohol. As the rust is dissolved, it is thrown off by the compound, the oil being deposited directly upon the perfectly clean surface of the metal. In washing the metal after cleaning, the acid, alcohol and surplus oil are removed, but the film of oil in contact with the surface remains, forming an effective protective coating.

What I claim is:

1. The metal cleaning compound containing an acid which will attack rust, a rust preventing oil which is not attacked by the acid and a solvent for the oil.

2. The metal cleaning compound containing a vegetable oil, a solvent therefor, and an acid which will attack rust.

3. The metal cleaning compound containing linseed oil, a solvent therefor, and an acid which will attack rust.

4. The metal cleaning compound containing linseed oil, alcohol, and an acid which will attack rust.

5. The metal cleaning compound containing raw linseed oil, alcohol and hydrochloric acid.

6. The metal cleaning compound containing a vegetable oil, an acid which will attack rust but does not attack the oil, and a solvent for the oil.

7. The metal cleaning compound containing raw linseed oil, alcohol, and an acid which will attack rust.

8. The metal cleaning compound comprising linseed oil, hydrochloric acid and wood alcohol.

9. The metal cleaning compound made by adding about fifty-six ounces of wood alcohol, and about forty-eight ounces of hydrochloric acid to about twenty-four ounces of a solution of linseed oil cut in alcohol.

In testimony whereof I affix my signature.

JOHN J. VARN BUHLER.